J. L. LOWE.
DIRIGIBLE HEADLIGHT.
APPLICATION FILED NOV. 29, 1910.
1,019,976.
Patented Mar. 12, 1912.
2 SHEETS—SHEET 1.
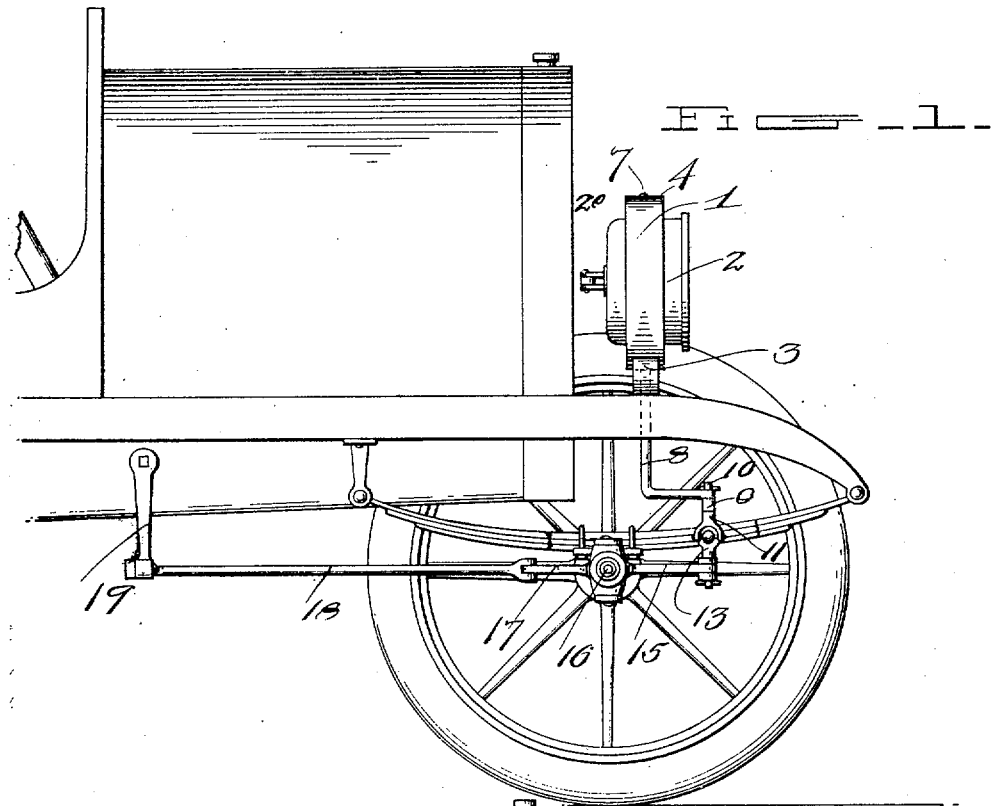
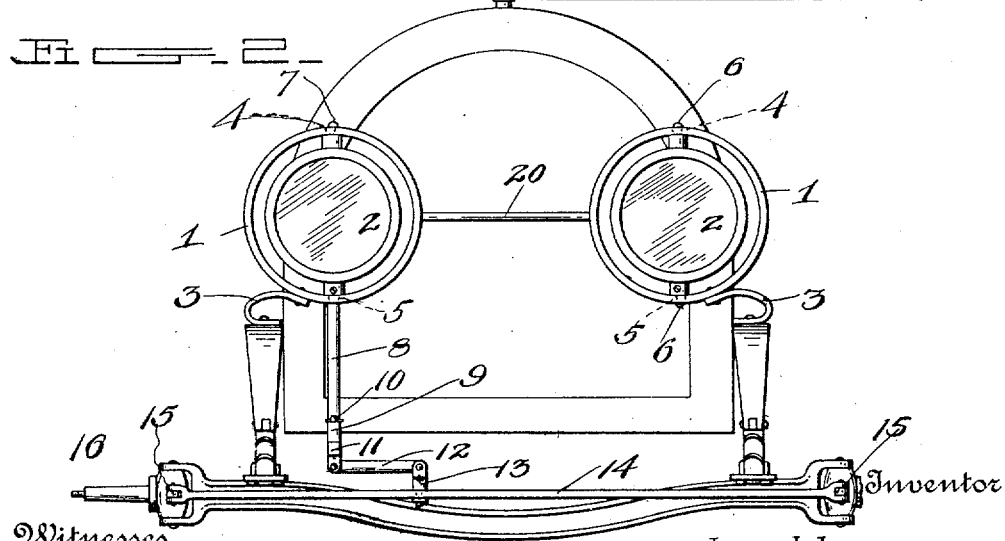
Witnesses
L. B. James
O. B. Hopkins
Inventor
James L. Lowe
by H. B. Willson &co
Attorneys

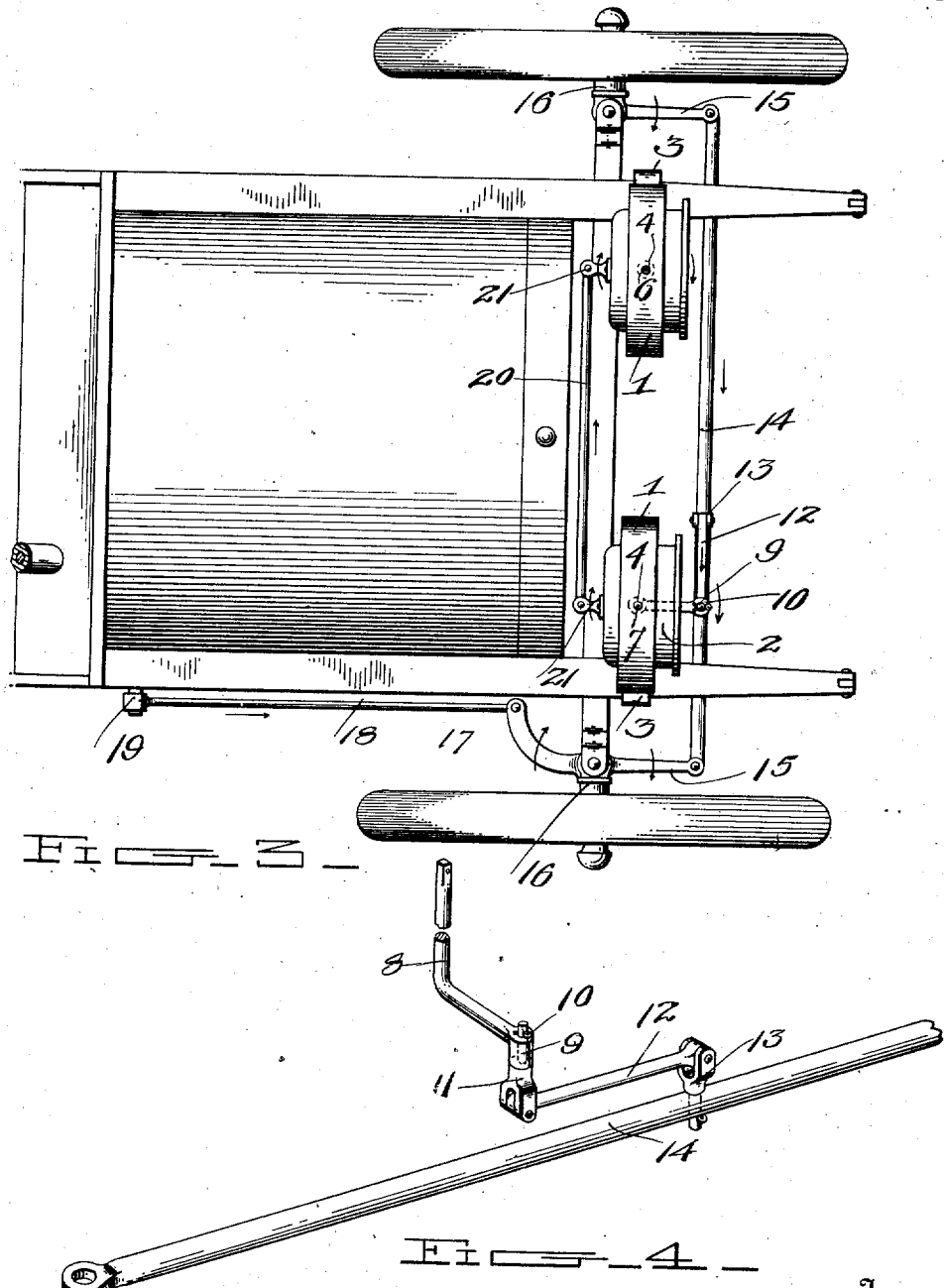

UNITED STATES PATENT OFFICE.

JAMES L. LOWE, OF MOORE, MONTANA.

DIRIGIBLE HEADLIGHT.

1,019,976.

Specification of Letters Patent. Patented Mar. 12, 1912.

Application filed November 29, 1910. Serial No. 594,626.

*To all whom it may concern:*

Be it known that I, JAMES L. LOWE, a citizen of the United States, residing at Moore, in the county of Fergus and State of Montana, have invented certain new and useful Improvements in Dirigible Headlights; and I do declare the following to be a full, clear, and exact description of the invention, such as will enable others skilled in the art to which it appertains to make and use the same.

This invention relates to improvements in dirigible head lights for vehicles.

One object of the invention is to provide a simple and inexpensive means for supporting and operatively connecting the lamps of the head lights with the steering mechanism of the vehicle whereby said lamps will be automatically turned in the direction in which the vehicle is steered.

With this and other objects in view, the invention consists of certain novel features of construction, combination and arrangement of parts as will be more fully described and particularly pointed out in the appended claim.

In the accompanying drawings: Figure 1 is a side view of the front end of an automobile with the near front wheel removed showing the application of the invention; Fig. 2 is a front view thereof with the front wheels both removed; Fig. 3 is a top plan view of the same; Fig. 4 is a detail perspective view of the connecting rod of the steering mechanism showing the arrangement of the levers and shafts for operatively connecting said rod with the lamps.

Referring more particularly to the drawings, 1 denotes the annular supporting frames or rings of the lamps 2. The rings or frames 1 are secured in position to support the lamps by fastening plates 3 which are secured to the outer sides of rings and to a suitable portion of the front end of the frame as shown.

The frames are provided with upper and lower bearing passages 4 and 5. One of the lamps is provided with upper and lower pivot studs 6 which are adapted to pivotally engage passages 4 and 5 of its supporting frame. The other lamp is provided on its upper side with a pivot stud 7 which is adapted to engage the upper pivot hole of its frame or ring and on its lower side the lamp is provided with a downwardly projecting crank arm 8 which is pivotally engaged with and projects through the lower passage 5 in the frame.

The lower end of the crank arm projects forwardly and is provided with a socket 9 adapted to receive the pivot pin 10 of a coupling member 11. On the end of the coupling member 11 are formed apertured ears or lugs between which is pivotally secured one end of a connecting rod 12 the opposite end of which is pivotally connected by a coupling member 13 to the front cross bar 14 of the steering mechanism. The opposite ends of the bar 14 are connected to the crank arms 15 of short steering axles 16 of the front wheels. One of the axles 16 has formed thereon the usual operating arm 17 which is connected by an operating rod 18 to the crank arm 19 on the steering shaft as shown.

The lamps 2 are connected together to move in unison by a connecting rod 20 the opposite ends of which are pivotally connected to brackets 21 arranged on the rear side of the lamps. By mounting the lamps and pivotally connecting the same to the steering mechanism of the vehicle as herein shown and described, the lamps will be turned in their supporting frames simultaneously with the operation of the steering mechanism to throw the light in the direction in which the vehicle is steered.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as defined in the appended claim.

Having thus described my invention what I claim is:—

A dirigible head light for vehicles comprising frames with lamps pivotally connected thereto, one of the lamps having a downwardly projecting arm bent forwardly at its lower end and having a socket in its terminal, a forked coupling member having its upper end pivoted to the socket and also having one end of a rod hinged to its forks, a cross bar connected to the steering mechanism having one end of a forked coupling pivoted to its body portion, its forked end having the other end of the above mentioned rod hinged thereto, brackets on the rear faces of the lamps, and a rod having its opposite ends pivoted to the brackets whereby to operate the lamps simultaneously.

In testimony whereof I have hereunto set my hand in presence of two subscribing witnesses.

JAMES L. LOWE.

Witnesses:
PATRICK NIHILL,
V. RUSSELL HENRY.